United States Patent [19]

Losic et al.

[11] Patent Number: 4,980,620

[45] Date of Patent: Dec. 25, 1990

[54] CURRENT-FREE SYNTHESIS OF PARAMETER-FREE ZERO-IMPEDANCE CONVERTER

[76] Inventors: Novica A. Losic, 4755-79 St., Kenosha, Wis. 53142; Ljubomir Dj. Varga, Deskaseva 6, 11000 Beograd, Yugoslavia

[21] Appl. No.: 503,229

[22] Filed: Apr. 2, 1990

[51] Int. Cl.[5] .............................................. H02P 5/16
[52] U.S. Cl. .................................. 318/268; 318/616; 388/819
[58] Field of Search ............... 388/804, 810, 813, 817, 388/819, 845, 846; 318/596, 606, 615, 616–618, 722, 723, 268; 363/21, 23, 26, 41, 174, 175; 323/282, 286, 201, 280

[56] References Cited

U.S. PATENT DOCUMENTS

| | | | |
|---|---|---|---|
| 3,811,079 | 5/1974 | Tashiro et al. | 388/804 |
| 3,935,523 | 1/1976 | Cleveland et al. | 318/618 X |
| 4,266,168 | 5/1981 | Andersen | 388/817 |
| 4,385,821 | 5/1983 | Kachelries | 318/616 X |
| 4,456,872 | 6/1984 | Froeschle | 323/286 |
| 4,471,281 | 9/1984 | Uezumi et al. | 388/810 X |
| 4,764,711 | 8/1988 | Deller | 388/817 X |
| 4,885,674 | 12/1989 | Varga et al. | 363/97 X |
| 4,910,447 | 3/1990 | Masters | 398/819 X |
| 4,912,386 | 3/1990 | Lurie | 318/618 X |

Primary Examiner—William M. Shoop, Jr.
Assistant Examiner—A. Jonathan Wysocki

[57] ABSTRACT

A method of synthesizing a system which forces finite value of an impedance to zero comprising a positive voltage feedback of a prescribed amount of voltage feed back and a negative voltage feedback to ensure stability of the system, whereby no current through the impedance is sensed and no parameters of the impedance are required to be known implying minimization of measurement noise and adaptive/self-tuning operation, respectively, in applications in which the method is used to synthesize load independent switch mode power converters and electric motor drive systems, incorporating any kind of motor, of infinite disturbance rejection ratio and zero order dynamics.

20 Claims, 3 Drawing Sheets

CURRENT-FREE SYNTHESIS OF PARAMETER-FREE ZERO-IMPEDANCE CONVERTER

FIELD OF THE INVENTION

This invention relates to circuits and systems and more particularly to electric motor drive systems and switch mode power converters using a current-free and parameter-free zero-impedance converter to provide for an infinitte disturbance rejection ratio and zero order dynamics in the former case and a load independence in the latter case without sensing and processing a current through the impedance of interest and without knowledge about resistive and reactive values of the impedance of interest.

BACKGROUND OF THE INVENTION

In the circuit and system theory and in practice it is of interest to minimize an impedance of interest. Further in order to achieve mathematically complete, and thus ideal, load independent operation, it can be shown that an impedance of interest should be forced to zero. All known techniques produce less or more successful minimization of the impedance of interest, usually in proportion to their complexity. None of the presently known techniques produces a zero impedance, except a synthesis methods described in a copending and coassigned applications by these two same inventors Lj. Dj. Varga and N. A. Losic, "Synthesis of Zero-Impedance Converter", Ser. No. 07/452,000, Dec. 1989, "Synthesis of Improved Zero-Impedance Converter" by N. A. Losic and Lj. Dj. Varga. Ser. No. 07/457,158, Dec. 1989, and "Parameter-Free Synthesis of Zero-Impedance Converter" by N. A. Losic and Lj. Dj. Varga, Ser. No. 07/484,494, Feb. 1990. A specific and particular applications of a zero-impedance converter, in addition to those in the applications above, are described in the U.S. Pat. No. 4,885,674 "Synthesis of Load-Independent Switch-Power Converters" by Lj. Dj. Varga and N. A. Losic, issued Dec. 1989, as well as in a two copending and coassigned applications of N. A. Losic and Lj. Dj. Varga, "Synthesis of Load-Independent DC Drive System", Ser. No. 07/323,630, Nov. 1988, and "Synthesis of Load-Independent AC Drive Systems", Ser. No. 07/316,664, Feb. 1989 (allowed for issuance Dec. 1989).

Another advantage due to the use of the zero-impedance converter, seen in creating possibility to reduce order of an electric motor drive system to zero by implementing appropriate (feed)forward algorithms if the system uses the zero-impedance converter (to produce a load independent operation), is explored and described in a copending application Ser. No. 07/468,122 by N. A. Losic and Lj. Dj. Varga "Synthesis of Drive Systems of Infinite Disturbance Rejection Ratio and Zero-Dynamics/Instantaneous Response", Jan. 1990. Furthermore, a generalized synthesis method to produce zero-order dynamics/instantaneous response and infinite disturbance rejection ratio in a general case of control systems of n-th order is described in a copending and coassigned application by Lj. Dj. Varga and N. A. Losic, "Generalized Synthesis of Control Systems of Zero-Order/Instantaneous Response and Infinite Disturbance Rejection Ratio", Ser. No. 07/479,275, Feb. 1990.

The zero-impedance converter and its particular and specific applications, as described in the patents/patent applications on behalf of these two inventors listed above, operate on a specific (given) values of a resistive and reactive parts of an impedance of interest, except in the patent application Ser. No. 07/484,494 listed above in which an algorithm based on current and voltage measurements is implemented.

SUMMARY OF THE INVENTION

It is therefore an object of the present invention to provide a current-free synthesis method for synthesizing a parameter-free-impedance converter, which includes elimination of differentiation in cases of inductive impedances (in cases of a capacitive impedance, an integration, rather than a differentiation, is present in the synthesis), to produce a current-free and parameter-free zero-impedance converter, operating without knowledge about resistive and reactive parts of the impedance of interest and without sensing and processing a current through the impedance of interest. Such a synthesized current-free and parameter-free zero-impedance converter is used to achieve an infinite disturbance rejection rattio and to enable further synthesis for a zero order dynamics in electric motor drive systems including dc, synchronous and asynchronous ac, and step motors, as well as to achieve a load independence in switch mode power converters. These applications are not exclusive; the current-free and parameter-free zero-impedance converter can be used in any application which can make use of its properties.

Briefly, for use with an electric motor drive system, the preferred embodiments of the present invention include a positive voltage feedback loop and a negative voltage feedback loop(s) with an exactly determined amount of a voltage fed in the positive loop equal to a resulting total voltage effectively acting across the motor impedance. The resulting total voltage effectively acting across the motor impedance and fed back in the positive feedback loop is equal to the difference between a voltage applied to the motor and a counter (back) electromotive force (emf) in case for negative voltage feedback loop(s) closed externally to the zero-impedance converter while in case of the negative voltage feedback loop being closed internally in the zero-impedance converter this difference is modified by the amount of feedback of the negative voltage feedback loop. The back emf in any electric motor with a constant air-gap flux is proportional to the motor shaft angular speed where the constant of proportionality $K_m$ is the back emf constant.

In addition to providing for an infinite disturbance rejection ratio, the scheme described in the previous paragraph also reduces the order of the system transfer function making it possible to further reduce this order to zero, i.e., to provide for the transfer function of the system being equal to a constant, by incorporating a (feed)forward algorithms to be shown.

For use with a switch-mode power converters, another preferred embodiment of the present invention includes a positive voltage feedback loop within a negative voltage feedback loop wherein the voltage fed back in the positive feedback loop is equal to a resulting total voltage effectively acting across the output lowpass filter inductor impedance. Such a scheme provides for independence of both load and output lowpass filter capacitor impedance.

The synthesis method presented in the embodiments provides for operation outside of the actual switching (pulse width modulated) environment as the sensed variables are those which are well behaved and/or well filtered and, further, no differentiation is performed, which provides for a noise- and ripple-free operation. No current through the impedance of interest is sensed and processed. The variables which are sensed are processed by only a constant-gain blocks and arithmetic blocks (summers). The algorithms of the synthesis method provide also independence from the parameters of the plant under the control (an electric motor or a power converter) and thus constitute an ideal control in that they provide for the ideal system performance with respect to both load disturbance/change and input command response and, at the same time, continuously adapt themselves in case of the changes of the controlled plant parameters.

The ability to provide a current-free and parameter-free zero-impedance converter, operating on variables sensed outside of the switching (pulse width modulated) domain in a self-sufficient and self-adaptive/self-tuning way and without differentiation is a material advantage of the present invention. By forcing an inductive impedance (as in electric motors and power converters) to zero, the current-free and parameter-free zero-impedance convereter provides for an instantaneous change of current through the inductive impedance. Alternatively, an instantaneous change of voltage across a capacitive impedance can be achieved. By forcing an electric motor impedance to zero, the current-free and parameter-free zero-impedance converter provides for an infinite disturbance rejection ratio, i.e., load independence, of the drive system and makes it possible to further achieve a zero order dynamics with additional (feed)forward algorithms. By forcing the impedance of the output lowpass filter inductor to zero, the current-free and parameter-free zero-impedance converter provides for the load independence of a power converter.

Other advantages of the present invention include its ability to be realized in an integrated-circuit form; the provision of such a method which needs not specifying the resistive and the reactive parts of the impedance of interest which, in general, may vary due to a temperature change, eddy currents and skin effect (resistance) or due to magnetic saturation (inductance); the provision of such a method which provides zero output-angular-velocity/position-change-to-load-torque-change transfer function in both transient and steady state; the provision of such a method which provides constant output-angular-velocity/position-change-to-input-command-change transfer function in both steady state and transient; the provision of such a method which provide zero output-voltage-change-to-lead-change transfer function in both steady state and transient; the provision of such a method which provides constant output-voltage-to-converter-input-error-signal-voltage transfer function in both steady state and transient; and the provision of such a method which simplifies design of negative voltage feedback loop.

As indicated previously, the circuit realization of the algorithm of the current-free and parameter-free zero-impedance converter reduces to implementing a constant-gain circuits and arithmetic ansumming) circuits. The circuit realization of the (feed)forward algorithms also reduces to implementing a constant-gain circuits.

In case of application to electric motor drive systems, the algorithms are independent of mechanisms of a torque production, these mechanisms being nonlinear in case of ac and step motors, as well as they are independent of a system moment of inertia and of a viscous friction coefficient, and of a nonlinear effects associated with the dynamical behavior of the drive system within its physical limits. The independence of the system moment of inertia implies infinite robustness of the drive system with respect to this parameter. In case of application to switch-mode power converters, the algorithms are independent of the parameters of the output lowpass filter. These algorithms therefore represent the most ultimate ones, as they provide a current-free and noise/ripple-free self-sufficient/self-adaptive control which produces an infinite disturbance rejection ratio, i.e., load independence, and zero order dynamics, the performance characteristics not previously attanied.

These and other objects and advantages of the present invention will no doubt be obvious to those skilled in the art after having read the following detailed description of the preferred embodiments illustrated in the FIGURES of the drawing.

DETAILED DESCRIPTION

Figure 1:
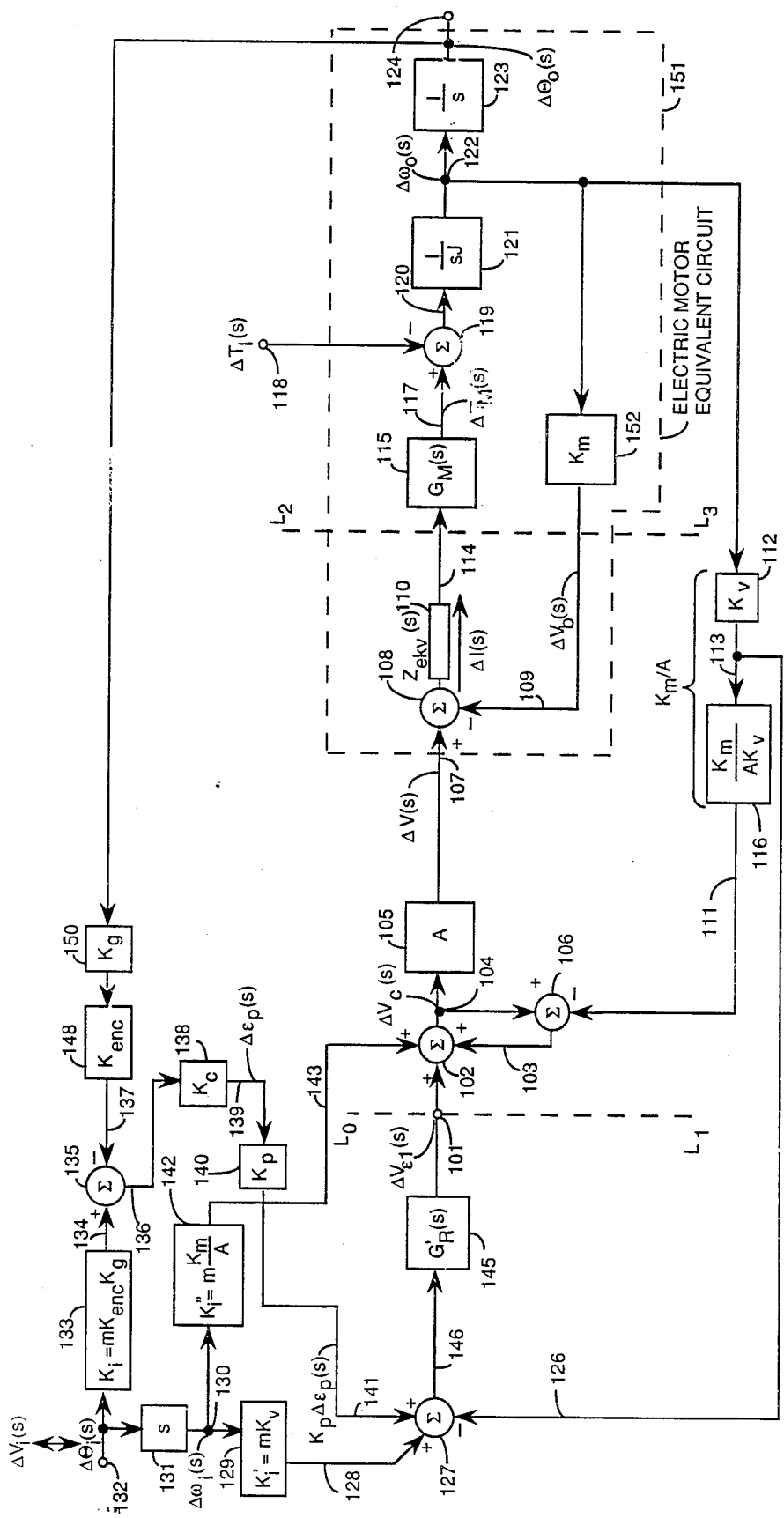
FIG. 1 is a block diagram of a first embodiment of the invention.

A current-free and parameter-free zero-impedance converter embodying the principles of the invention applied to synthesizing electric motor drive systems of infinite disturbance rejection ratio and zero dynamics/instantaneous response and using both position and velocity feedback loops is shown in FIG. 1. The use of the two loops may be preferred in order to avoid filtering of a pulse width modulated (PWM) voltage applied to the motor when this voltage is used to close an internal negative voltage feedback loop as in case of FIG. 2. It should be stated that it is not necessary to close the position feedback loop in the embodiment in FIG. 1, but it was chosen to present embodiment in FIG. 1 with both position and velocity feedback loops closed for generality purposes. From such a general scheme it is easily shown that by having only the velocity feedback loop closed still provides for the properties of the infinite disturbance rejection ratio and zero order dynamics.

In FIG. 1, it is assumed that input voltage $V_{in}$ (not illustrated) applied to a PWM power stage within block 105 in constant so that a voltage gain constant A characterizes transfer function of the PWM control and power stage 105. The power stage within block 105 is implemented appropriately for the kind of motor which is powers; for example, it may be a dc-to-dc converter for dc motors or a dc-to-ac converter for a motors or a PWM power stage employed for driving step motors (in this latter case some additional circuits may be used without affecting the properties of the embodiment). The PWM control portion within block 105 then performs appropriate control function. What is of interest is that the overall voltage gain of the control and power PWM stage 105 is in a constant A. Thus, a signal $\Delta V_c(s)$ on lead 104 is voltage-amplified A times to appear as voltage $\Delta(V)(s)$ on lead 107 with an associated power/current $\Delta I(s)$ supplied by the input voltage source $V_{in}$.

In FIG. 1, portion between boundaries $L_0-L_1$ and $L_2-L_3$ denotes current-free and parameter-free zero-impedance converter; the remaining portion illustrates an application of such a synthesized converter in synthesizing an electric motor drive system of infinite disturbance rejection ratio and zero order dynamics/instantaneous response.

The current-free and parameter-free zero-impedance converter employs a positive voltage feedback loop within negative position and velocity backback loops. The positive voltage feedback loop incorporates a voltage loop algebraic summer 106 which provides at its output, lead 103, a resulting total voltage as a result of subtracting a processed back emf signal, available on lead 111, from a resulting total control signal $\Delta V_c(s)$, available at point 104. The negative position and volocity feeback loops incorporate a digital encoder 148 of gain $K_{enc}$[pulses/rad] and a tach 112 of gain $K_v$[Volt/rad/sec], respectively. The purpose of the positive voltage feedback loop is to synthesize in a current-free and parameter-free manner the zero-impendance converter with respect to a motor impedance 110 whose value $Z_{ekv}(s)$ is opposed by a negative impedance value provides by the action of the loop forcing the resulting (trans)impedance to zero. The purpose of negative velocity and position feeback loops is to stabilize the system and control its dynamics by means of a stabilizing and control block 145 of transfer function $G_R'(s)$.

The control function in direct path with respect to the positive feedback loop incorporates a position direct path circuit 133 of a constant gain $K_i$. The control function in direct path with respect to the velocity feedback loop incorporates a velocity direct path circuit 129 of a constant gain $K_1'$. Also, the control function in the feedforward path incorporates a feedforward circuit 142 of a constant gain $K_i''$. The purpose of these three control functions is to, together with the positive voltage feedback loop, bring the system transfer function to a zero-order one, i.e., to a constant m, which they do for the gains $K_i$, $K_i'$, and $K_i''$ synthesized as shown in FIG. 1, thereby providing a zero order dynamics with associated instantaneous response to input command.

In operation, the current $\Delta I(s)$ flows through an electric motor impedance 110 of value $Z_{ekv}(s)$. The electric motor impedance 110 is a series connection of a resistance and an inductive reactance in case of a dc, synchronous ac, and step motors. In case of asynchronous (induction) ac motor this impedance consists of a series connection of a stator impedance with a parallel connection of a magnetizing reactance and a rotor impedance referred to stator. It should be stated at this point that neither current through the impedance nor the impedance itself are to be measured/known for the synthesis method presented here. The current, whose Laplace transform is $\Delta I(s)$, provides a motor developed torque $\Delta T_M(s)$ by means of a torque producing mechanisms represented by a block 115 of transfer function $G_M(s)$. In case of n-phase motors, a total current $\Delta I(s)$ is understood to be on lead 114 as an input to block 115, and the current-free and parameter-free zero-impedance converter, between boundaries $L_0$–$L_1$ and $L_2$–$L_3$, is assumed to be per-phase based. As it will be shown, the algoritthms of the embodiment in FIG. 1 are independent of the torque producing mechanisms so that these mechanisms were represented by the (linear) Laplace-transformed function $G_M(s)$ even though in some motors these mechanisms are nonlinear. The motor developed torque $\Delta T_M(s)$, available on lead 117, is opposed by a load torque $\Delta T_l(s)$, supplied externally at point 118. This opposition takes place in an algebraic summer 119. The difference between the two torques, $\Delta T_M(s) - \Delta T_l(s)$, is supplied by lead 120 to a block 121 which denotes transformation from a torque to an angular shaft speed, and whose transfer function is 1/sJ, where J is a system moment of inertia. Normally, block 121 has transfer function 1/(sJ+B) where B is a viscous friction coefficient. However, as it will be shown, the algorithms of the embodiment of FIG. 1 are independent of the transfer function of block 121, whether it be expressed as 1/sJ or 1/(sJ+B), implying infinite robustness of the system to the mechanical parameters. An angular shaft speed $\Delta \Omega_o(s)$ is produced at point 122 while an angular shaft position $\Delta \theta_o(s)$ is produced, integrating the speed in block 123, at point 124. A back emf $\Delta V_b(s)$ is produced on lead 109 opposing voltage applied to the motor $\Delta V(s)$, available at point 107. This opposition is represented by subtracting the back emf from the voltage applied to the motor in an algebraic summer 108. As discussed previously, in the "Summary of the Invention" section, the back emf is produced in proportion to the angular speed, where the constant of proportionality is a constant $K_m$ (denoted in block 152), for a constant air-gap flux in an electric motor, regardless of the type of motor. For any other air-gap flux distribution an appropriate $K_m(a)$ would be characterizing block 152 as well as any other block(s) in which it appears, e.g., blocks 116 and 142, without affecting the algorithms derived here. The portion within broken line in FIG. 1, referred to with numeral 151, represents an electric motor equivalent circuit where $G_M(s)$ denotes a torque production mechanisms on the basis of a total current supplied to the motor and $K_m$ denotes a back emf production mechanisms for constant air-gap flux. It should be understood that the back emf results into a reduced average (dc) voltage applied to the motor impedance $Z_{ekv}(s)$ in case of a dc motor and, in cases of ac and step motors, it reduces a peak-to-peak, and thus rms, voltage applied to the motor impedance $Z_{ekv}(s)$.

The angular shaft spped $\Delta\Omega_o(s)$ and position $\Delta\theta_o(s)$ are sensed by tach 112 and encoder 148. In general, a gear box may be used in the position loop; in FIG. 1 this is denoted by a gear ratio constant $K_g$ characterizing gear box 150. The position and velocity feedback signals may alternatively be derived from a single feedback sensing device by appropriate integration/differentiation, without changing the principles of operation of the embodiment. The angular shaft speed $\Delta\Omega_o(s)$ is sensed by tach 112 and a velocity feedback signal is applied via lead 126 to a summer 127 to close the negative feedback loop. The velocity command voltage, obtained by differentiating and multiplying by a constant $K_i'$ the position command $\Delta\theta_i(s)$, is applied by lead 128 to the summer 127. The differentiation of the position command $\Delta\theta_i(s)$ is performed in a block 131 while a velocity direct path circuit 129 multiplies the velocity signal voltage $\Delta\Omega_i(s)$, available at point 130, to provide the velocity command voltage on lead 128. The position command $\Delta\theta_i(s)$ applied at point 132 is processed by a position direct path circuit 133 of a constant gain transfer function $K_i$ and applied to an algebraic summer 135 via lead 134. The signal on lead 134 is in a form of pulses whose number corresponds to the commanded angular shaft position. In that sense, the velocity signal voltage $\Delta\Omega_i(s)$ corresponds to the rate of the position command pulses. The algebraic summer 135 is used to functionally represent a digital counter within a phase/frequency detector which counts in opposite directions position feedback pulses supplied by lead 137 and position command pulses supplied by lead 134 into the counter. A number of pulses corresponding to the position error is supplied by lead 136 to a D/A converter 138 whose gain is $K_c$[V/pulses] and whose output 139 provides the position error $\Delta \epsilon_p(s)$ in an analog form. A block 140, characterized by a constant $K_p$, represents a gain constant in the position loop so that a position error voltage $K_p \Delta \epsilon_p(s)$ is provided at the output of block 140 and supplied by measn of lead 141 to the algebraic summer 127. The algebraic summer 127 adds the velocity command voltage, available on lead 128, in a positive manner to the position error voltage, available on lead 141, and subtracts from this sum the velocity feedback signal, available on lead 126. Thus, at the output of the algebraic summer 127 a resulting error voltage is available and is brought by means of lead 146 to a stabilizing and control circuit 145 characterized by transfer function $G_R'(s)$. TThe stabilizing and control 145 produces at its output 101 a control signal $\Delta V_{\epsilon 1}(s)$. The control signal $\Delta V_{\epsilon 1}(s)$ is added in a positive manner to a feedforward signal, available on lead 143, in a summer 102. The feedforward signal on lead 143 is available at the output of a feedforward circuit 142 characterized by a gain constant $K_i''$ which is fed at its input by the velocity voltage $\Delta \Omega_i(s)$. It should be understood that the feedforward signal increases a dc voltage applied to the motor impedance $Z_{ekv}(s)$ in case of a dc motor, and in cases of ac and step motors it increases a peak-to-peak, and thus rms, voltage applied to the motor impedance $Z_{ekv}(s)$, i.e., the feedforward signal opposes action of the back emf $\Delta V_b(s)$.

A resulting total voltage is obtained by subtracting a processed back emf signal, available on lead 111, from a resulting total control signal $\Delta V_c(s)$, available at point 104, in a voltage loop algebraic summer 106. The resulting total voltage, obtained in the described way, is then added in a positive feedback manner via lead 103 to the control signal $\Delta V_{\epsilon 1}(s)$, available on lead 101, and to the feedforward signal, available on lead 143. The addition of the three signals is done in summer 102 whose output provides the resulting total control signal $\Delta V_c(s)$, available at point 104. The processed back emf signal, available on lead 111, is obtained by passing the tach signal, available on lead 113, through a tach gain circuit 116, whose gain is chosen such that the overall gain of a tach gain circuit is equal to $K_m/A$. The resulting total control signal $\Delta V_c(s)$, available at point 104, is applied to a pulse width modulation control and power stage 105 where it is voltage amplified A times appearing as voltage $\Delta V(s)$ on lead 107 which, opposed by the back emf $\Delta V_b(s)$ inherently produced within a motor on lead 109, creates motor current $\Delta I(s)$ through the motor equivalent impedance $Z_{ekv}(s)$. Since both the resulting total control signal $\Delta V(s)$, available at point 104, and the processed back emf signal, available on lead 111, are A times smaller than the corresponding voltage $\Delta V(s)$ and $\Delta V_b(s)$, respectively it follows that the resulting total voltage, fed back in a positive feedback manner by means of lead 103, is actually a resulting total voltage, but A times smaller, effectively acting across the motor impedance $Z_{ekv}(s)$. By subtracting the processed back emf signal on lead 111 from the resulting total control signal $\Delta V_c(s)$, available at point 104, the necessary signal processing is done outside from the switched (PWM) domain and the resulting total voltage fed back in the positive feedback manner via lead 103, and being equal to $[\Delta V_c(s) - (\Delta V_b(s)/A] = [[\Delta V(s) - \Delta V_b(s)]/A]$, is voltage-amplified A times in PWM control and power stage 105 to effectively provide for the voltage drop across the motor impedance $Z_{ekv}(s)$ equal to $[\Delta V(s) - V_b(s)]$ and supplied via lead 107 to the motor impedance. This means that the effects due to the impedance $Z_{ekv}(s)$ are nulled out in both steady state and transient as the steady state voltage drop across the impedance (due to the nonzero impedance $Z_{ekv}(s)$ as well as the transient voltage drop across the impedance (due to the nonzero impedance $Z_{ekv}(s)$) are compensated for by the action of the voltage positive feedback loop. Thus, the action of the positive feedback loop essentially forces the (effects due to) motor impedance $Z_{ekv}(s)$ to zero by compensating for the voltage drop across $Z_{ekv}(s)$ in both steady state and transient and without having to know the parameters of the impedance $Z_{ekv}(s)$, i.e., its resistive and reactive values, as well as without having to sense/measure current $\Delta I(s)$ through the impedance $Z_{ekv}(s)$.

As mentioned in the second paragraph of this section, the implementation of the PWM control and power stage 105 is irrelevant for the functioning of the embodiment of FIG. 1. It is only the voltage gain A of this block which is involved in the algorithms of the embodiment. It is understood that signals associated with the summing circuit 102 are compatible in that they are ac or dc varying signals such that the PWM control portion within block 105 operates on appropriate control signals for the PWM processing, i.e., a dc varying signal and a tringular carrier signal for producing PWM waveform for dc motors, or an ac varying sinusoidal signal or pulse signal and a carrier for producing PWM waveform for ac or step motors, respectively. Thus, the voltage supplied to the motor $\Delta V(s)$ is in a pulse width modulated form whose average value corresponds to a voltage seen by a dc motor; its fundamental component corresponds to a sinusoidal voltage seen by an ac motor; its fundamental component corresponds to a sinusoidal voltage seen by an ac motor; and its pulsed waveform, free from the actual pulse width modulation, is seen by a step motor.

The scaling factor m in blocks 133, 129, and 142 has units in [radian/Volt] for a voltage command $\Delta V_i(s)$ actually representing the position command $\Delta \theta_i(s)$, i.e., for $\Delta V_i(s) \rightarrow \Delta \theta_i(s)$, and, as it will be shown shortly, a zero order dynamics is provided as a zero order transfer function equal to m is obtained, i.e., $\Delta \theta_o(s)/\Delta \theta_i(s) = m$. As previously indicated, gain constants $K_v$ and $K_{enc}$ are dimensioned in [V/rad/sec] and in [pulses/rad], respectively. Since the back emf constant $K_m$ has units in [V/rad/sec], and gain constants A and $K_g$ are dimensionless, the gain constants of blocks 133, 129, and 142 are dimensioned as $K_i$[pulses/V], $K_i'$[sec], and $K_i''$[sec], respectively. The differentiation of the voltage command $\Delta V_i(s)$, performed in block 131, has units in [1/sec] so that the velocity signal voltage, available at point 130, is expressed in [V/sec] for the voltage command $\Delta V_i(s)$, applied to terminal 132, expressed in Volts. Thus, the outputs of blocks 133, 129, and 142, are in pulses (lead 134), Volts (lead 128), and Volts (lead 143), respecttively. It is seen from dimensioning of these blocks that the position direct path circuit is implemented as a voltage-to-pulses converter of gain $K_i$[pulses/V]; the velocity direct path circuit is implemented as a differentiator circuit of differentiating time constant $K_i'$[sec]; and the feedfoward circuit is implemented as a differentiator circuit of differentiating time constant $K_i''$[sec]. As explained earlier, the position error voltage available on lead 141 is in analog form and is also expressed in Volts. The tach gain circuit 116 is characterized by a dimensionless gain constant $K_m/AK_v$ so that the combined gain of tach 112 and circuit 116, equal to $K_m/A$, has units in [V/rad/sec].

A mathematical analysis of the embodiment of FIG. 1 follows. (Assume $K_i''\Delta\Omega_i(s)=0$).

From FIG. 1, $\Delta V_c(s)=\Delta V_{\epsilon 1}(s)+\Delta V_c(s)-K_m\Delta\Omega_o(s)/A$ so that $\Delta V(s)=A\Delta V_c(s)$ can also be written as $\Delta V(s)=A[\Delta V_{\epsilon 1}(s)+\Delta V_c(s)-K_m\Delta\Omega_o(s)/A] = A\Delta V_{\epsilon 1}(s)+A\Delta V_c(s)-K_m\Delta\Omega_o(s)$. Also, from FIG. 1, $\times V(s)-\Delta V_b(s)=Z_{ekv}(s)\Delta I(s)$. Combining the last two expressions $A\Delta V_{\epsilon 1}(s)+A\Delta V_c(s)-K_m\Delta\Omega_o(s)-\Delta V_b(s) = Z_{ekv}(s)\Delta I(s)$. But, $A\Delta V_c(s)=\Delta V(s)$ and, also, for $\Delta T_l(s)=0$, $\Delta\Omega_o(s)=(1/sJ)G_M(s)\Delta I(s)$ so that $A\Delta V_{\epsilon 1}(s)=-[\Delta V(s)-\Delta V_b(s)]+\Delta I(s)[K_m(1/sJ)G_M(s)+Z_{ekv}(s)=\Delta I(s)[-Z_{ekv}(s)+K_m(1/sJ)G_M(s)+Z_{ekv}(s)]$. Therefore the transadmittance of the embodiment of FIG. 1 is $$\Delta I(s)/\Delta V_{\epsilon 1}(s)=A/[K_m(1/sJ)G_M(s)] \tag{1}$$

A transfer function from the input to the current-free and parameter-free zero-impedance converter (point 101) to the angular shaft speed (point 122) is therefore (obtained as $\Delta\Omega_o(s)/\Delta V_{\epsilon 1}(s)=[\Delta I(s)/\Delta V_{\epsilon 1}(s)][\Delta\Omega_o(s)/\Delta I(s)]$)

$$\Delta\Omega_o(s)/\Delta V_{\epsilon 1}(s)=A/K_m \tag{2}$$

The transfer function of the embodiment of FIG. 1, for $K_i''=0$, is $$\Delta\theta_o(s)/\Delta\theta_i(s)=G_o[1+s\tau_z]/[1+sY_p(s)] \tag{3}$$

where $$G_o=K_i/K_gK_{enc} \tag{4}$$
$$\tau_z=K_i'/K_iK_cK_p \tag{5}$$
$$Y_p(s)=[G_R'(s)AK_v+K_m]/[G_R'(s)AK_gK_{enc}K_cK_p] \tag{6}$$

The dynamic stiffness of the embodiment of FIG. 1 is $$-\Delta T_l(s)/\Delta\theta_o(s)=[T_1(s)+T_2(s)[Z_{ekv}(s)-Z_{ekv}(s)]+T_4(s)]/[Z_{ekv}(s)-Z_{ekv}(s)]=\infty \tag{7}$$

where $$T_1(s)=G_M(s)G_R'(s)A(K_gK_{enc}K_cK_p+sK_v) \tag{8}$$

$$T_2(s)=s^2J \tag{9}$$

$$T_4(s)=G_M(s)sK_m \tag{10}$$

Denoting a part of the angular shaft position response due to the input position command in Eq. (3) $\Delta\theta_{oi}(s)$, and a part of the output angular shaft position response due to the load torque disturbance in Eq. (7) $\Delta\theta_{ol}$, the disturbance rejection ratio for the embodiment of FIG. 1 is $$D_{rr}(s)=\Delta\theta_{oi}(s)/\Delta\theta_{ol}(s)=\{[T_1'(s)+T_4'(s)]\Delta\theta i(s)\}/\{[-Z_{ekv}(s)-Z_{ekv}(s)][-\Delta T_l(s)]\}=\infty \tag{11}$$

where $$T_1'(s)=G_M(s)G_R'(s)AK_iK_cK_p \tag{12}$$

$$T_4'(s)=G_M(s)G_R'(s)AsK_i' \tag{13}$$

Eqs. (7) and (11) imply a load independence of the embodiment of FIG. 1, i.e., infinite disturbance rejection ratio.

Eq. (2) implies that all electrical and mechanical time constants in the system in FIG. 1 are reduced to zero while keeping finite loop gain(s)! The velocity and the position loop gain are, respectively $$LG_v(s)=K_vR'(s)(A/K_m) \tag{14}$$

$$LG_p(s)=K_gK_{enc}K_cK_pG_R'(s)(A/K_m)/\{s[1+K_vG_R'(s)\cdot(A/K_m)]\} \tag{15}$$

Eqs. (14) and (15) imply a perfectly stable system wherein transfer function $G_R'(s)$ is simply designed for any desired gain/phase margin. The deisgn of transfer function $G_R'(s)$ is actually very much simplified as the embodiment in FIG. 1 is made of infinite disturbance rejection ratio (already shown) and of zero order/instantaneous response (will be shown shortly) due to the algorithms none of which is dependent on $G_R'(s)$.

In deriving Eq. (1) it can be seen that an infinite transadmittance part, equal to $A/[Z_{ekv}(s)-Z_{ekv}(s)]=\infty$, is in series with the finite transadmittance part, given by Eq. (1), so that the total transadmittance is equal to the finite transadmittance part, i.e., $Y(s)=\Delta I(s)/\Delta V_{\epsilon 1}(s)=A/[Z_{ekv}(s)-Z_{ekv}(s)+K_m(1/sJ)G_M(s)]$, so that $1/Y(s)=1/\{A/[Z_{ekv}(s)-Z_{ekv}(s)]\}+1/\{A/[K_m(1/sJ)G_M(s)]\}1/Y_a(s)+1Y_b(s)$, where $Y_a(s)=\infty$, and $Y_b(s)=A/[K_m(1/sJ)G_M(s)]=Y(s)$.

It is thus seen that all properties of the embodiment of FIG. 1, as given in Eqs. (1), (2), (3), (7), (11), (14), and (15) are due to forcing the motor equivalent impedance $Z_{ekv}(s)$ to zero. It is additionally seen that an independence from the mechanical parameters including mommentt of inertia J and from the torque producing mechanisms $G_M(s)$ is achieved. It will further be shown that the system transfer function, given in Eq. (3), can be reduced to a constant m implying a zero order dynamics of the embodiment of FIG. 1.

From Eq. (3), the zero order dynamics is achieved for $$\tau_z=Y_p(s) \tag{16}$$

which implies that time constant $\tau_z$ should become a function of s. By setting a gain constant $K_i'$, which characterizes the velocity direct path circuit 129, a function of s, the zero order dynamics, achieved for condition of Eq. (16), is obtained by substituting Eqs. (5) and (6) in Eq. (16) yielding $$K_i'(s)/K_i=[G_R'(s)AK_v+K_m]/[G_R'(s)AK_gK_{enc}] \tag{17}$$

in which case the system transfer function of Eq. (3) becomes $$\Delta\theta_o(s)/\Delta\theta_i(s)=G_o \tag{18}$$

The condition for zero order dynamics, as given in Eq. (17), can be resolved in two independent conditions, one for position and another for velocity loop, by synthesizing the respective gain constant as $$K_i=mK_{enc}K_g \tag{19}$$

and $$K_i'=mK_v+mK_m/G_R'(s)A \tag{20}$$

in which case Eq. (18) becomes $$\Delta\theta_o(s)/\Delta\theta_i(s)=m \tag{21}$$

The zero order dynamics provided in Eq. (21) implies instantaneous response to the input command with associated zero error in both steady state and transient. The condition in Eq. (20) is simply implemented, with reference to FIG. 1 and remembering that Eq. (3) was originally derived for $K_i''=0$, by implementing the velocity direct path circuit 129 such that it is characterized by a gain constant $$K_i' = mK_v \qquad (22)$$

and by implementing the feedforced circuit 142 such that it is characterized by a gain constant given as $$K_i'' = mK_m/A \qquad (23)$$

The property of the embodiment of FIG. 1 of forcing the impedance $Z_{ekv}(s)$ to zero therefore provided for the infinite disturbance rejection ratio, resulting in Eq. (11), and this same property together with the conditions in Eqs. (19), (22), and (23) provided for the zero order dynamics, resulting in Eq. (21).

It has been shown that the characteristics of the embodiment of FIG. 1, culminating in Eqs. (11) and (21), have been obtained without: (a) sensing (PWM) waveform of current through the motor impedance $Z_{ekv}(s)$, (b) processing signals in the switched (PWM) domain which inherently is nosiy and has ripple, (c) using differentiation, (d) knowing resistive and reactive parameters of the motor impedance $Z_{ekv}(s)$, (e) knowing mechanisms of torque production $G_M(s)$, (f) knowing transfer function of a, in general case used, stabilizing and control circuit $G_R'(s)$, and (g) without respect to the system mechanical parameters, including nonlinearities and the system moment of inertia J.

Figure 2:
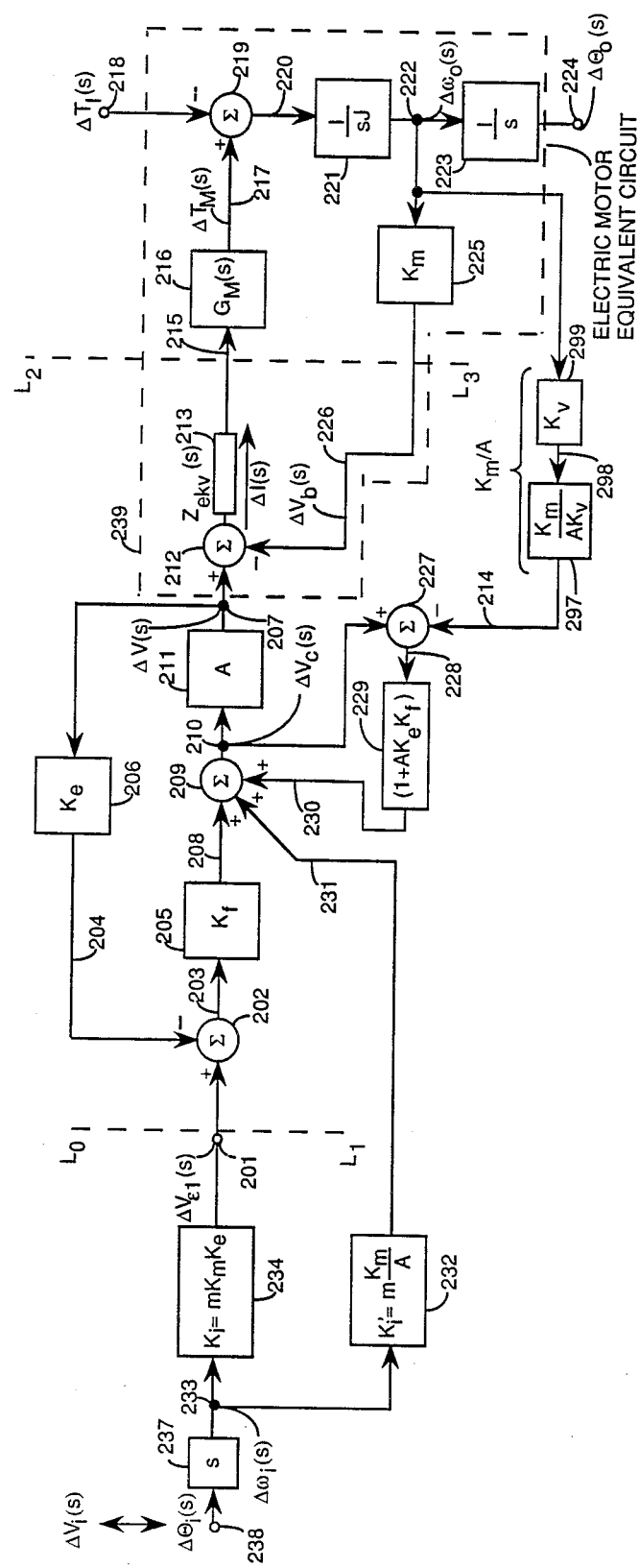
FIG. 2 is a block diagram of another embodiment of the invention.

A current-free and parameter-free zero-impedance converter embodying the principles of another embodiment of invention applied to synthesizing electric motor drive systems of infinite disturbance rejection ratio and zero order dynamics while using an internal negative voltage feedback loop is shown in FIG. 2. In FIG. 2, it is assumed that input voltage $V_{in}$ (not illustrated) applied to a pulse width modulated power stage within block 211 is constant so that a gain constant A characterizes transfer function of the PWM control and power stage 211. The power stage within block 211 is implemented appropriately for the kind of motor which it powers; for example, and as mentioned in connection with FIG. 1, it may be a dc-to-dc converter for dc motors or dc-to-ac converter for ac motors or a PWM power stage employed for driving step motors. The PWM control portion within block 211 then performs appropriate control function. What is of interest is that the overall voltage gain of the control and power stage 211 is a constant A. Thus, a signal $\Delta V_c(s)$ on lead 210 is voltage-amplified A times to appear as voltage $\Delta V(s)$ on lead 207 with an associated power/current $\Delta I(s)$ supplied by the input voltage source $V_{in}$.

In FIG. 2, portion between boundaries $L_0-L_1$ and $L_2-L_3$ denotes current-free and parameter-free zero-impedance converter; the remaining portion illustrates an application of such a synthesized converter in synthesizing an electric motor drive system of infinite disturbance rejection ratio and zero order dynamics/instantaneous response.

The current-free and parameter-free zero-impedance converter employs a positive voltage feedback loop and a negative voltage feedback loop. The positive voltage feedback loop incorporates a voltage loop algebraic summer 227 which provides at its output, lead 228, a resulting total voltage as a result of subtracting a processed back emf signal, available on lead 214, from a resulting total control signal $\Delta V_c(s)$, available at point 210. The resulting total voltage on lead 228 is amplified in a voltage gain circuit 229 whose gain is $(1+AK_eK_f)$. The output of the voltage gain circuit 229 provides a processed resulting total voltage available on lead 230. The negative voltage feedback loop incorporates a voltage feedback circuit 206 whose transfer function is a constant $K_e$. The purpose of the positive voltage feedback loop is to synthesize in a current-free and parameter-free manner the zero-impedance converter with respect to a motor impedance 213 whose value $Z_{ekv}(s)$ is opposed by a negative impedance value provided by the action of the loop forcing the resulting (trans)impedance to zero. The purpose of the negative voltage feedback loop is to stabilize the system in an inherent an self sufficientt manner so that the converter can be used as an autonomous entity in any application.

In operation, the current $\Delta I(s)$ flows through an electric motor impedance 213 of value $Z_{ekz}(s)$. The electric motor impedance 213 iis a series connection of a resistance and an inductive reactance in case of a dc, synchronous ac, and step motors. In case of an asynchronous (induction) ac motor this impedance consists of a series connection of a stator impedance with a parllel connection of a magnetizing reactance and a rotor impedance referred tto stator. It should be stated again, as in connection with FIG. 1, that neither current through the impedance nor the impedance itself are to be measured/known for the synthesis method presented here. The current, whose Laplace transform is $\Delta I(s)$, provides a motor developed torque $\Delta T_M(s)$ by means of a torque producing mechanisms represented by a block 216 of transfer function $G_M(s)$. In case of n-phase motors, a total current $\Delta I(s)$ is understood to be on lead 215 as an input to block 216, and the current-free and parameter-free zero-impedance converter, between boundaries $L_0-L_1$ and $L_2-L_3$, is assumed to be perphase based. As discussed in connection with FIG. 1, the Laplace-transformed (and therefore linearized) function $G_M(s)$ is used to denote the torque producing mechanisms of any electric motor, including motors in which these mechanisms are rather nonlinear, because the algorithms of the embodiment of FIG. 2, to be derived, are independent of the torque producing mechanisms. The motor developed torque $\Delta T_M(s)$, available on lead 217, is opposed by a load torque $\Delta T_l(s)$, supplied by a mechanical load at point 218. This opposition takes place in an algebraic summer 219. The difference between the two torques, $\Delta T_M(s) - \Delta T_l(s)$, is supplied by lead 220 to a block 221 which denotes transformation from a torque to an angular shaft speed $\Delta \Omega_o(s)$, and whose transfer function is $1sJ$ where J is a system moment of inertia. As discussed in connection with FIG. 1, a viscous friction coefficientt (B) has been omitted in the transfer function of block 221 because, as it will be shown, the algorithms of the embodiment of FIG. 2 are independent of the transfer function of block 221. The angular shaft speed $\Delta \Omega_o(s)$ is produced at point 222 while an angular shaft position $\Delta \theta_o(s)$, obtained by integration of the speed in block 223, is available at point 224. A back electromotive force $\Delta V_b(s)$ is produced on lead 226 which opposes a voltage applied to the motor $\Delta V(s)$ available at point 207. This opposition is represented by subtracting the back emf from the voltage applied to the motor in an algebraic summer 212. As said previously in connection with FIG. 1, for a constant air-gap flux in an electric motor, regardless of type of motor, the back emf is produced in proportion to the angular speed where the proportionality constant is denoted $K_m$ and is drawn as a block 225 in FIG. 2. For any other air-gap flxu distribution an appropriate $K_m(s)$ can be used to denote the back emf production mechanisms, without affecting the generality of the algoritthms derived here. The portion within broken line in FIG. 2, referred to with numeral 239, represents an electric motor equivalent circuit where $G_M(s)$ denotes a torque production mechanisms on the basis of a total current supplied to the motor and $K_m$ a back emf production mechanisms for a constant air-gap flux. It should be understood, as said previously in connection with FIG. 1, that the back emf results into a reduced average (dc) voltage applied to the motor impedance $Z_{ekv}(s)$ in case of a dc motor and, in cases of ac and step motors, it reduces a peak-to-peak, and thus rms, voltage applied to the motor impedance $Z_{ekv}(s)$.

The negative voltage feedback loop is closed through a voltage feedback circuit 206 characterized by a gain constant $K_e$ which supplies a voltage feedback signal on lead 204. The voltage feedback signal is subtracted in a summer 202 from a direct path signal $\Delta V_{\epsilon 1}(s)$ supplied at point 201 which is input to the current-free and parameter-free zero-impedance converter. A voltage error signal is thus produced at the output lead 203 of the summer 202 and is passed through a forward circuit 205 of gain $K_f$. The forward circuit 205 outputs a forward control signal and supplies it to a summing circuit 209 via lead 208. The direct path signal $\Delta V_{\epsilon 1}(s)$ is provided at the output of a direct path circuit 234 characterized by a gain $K_i$. The input of the direct path circuit is fed by an input velocity command $\Delta \Omega_i(s)$, available a point 233, provided by differentiating an input position command $\Delta \theta_i(s)$ in differentiator 237. A position voltage command $\Delta V_i(s)$ corresponding to the input position command $\Delta \theta_i(s)$ is applied at terminal 238. The input velocity command $\Delta \Omega_i(s)$ is also fed to a feedforward circuit 232 characterized by a gain constant $K_i'$. A feedforward signal, available at the output of feedforward circuit 232, id fed in a positive manner into the summing circuit 209 by means of a lead 231.

A resulting total voltage is obtained by subtracting a processed back emf signal, available on lead 214, from a resulting total control signal $\Delta V_c(s)$, available at point 210, in a voltage loop algebraic summer 227. The resulting total voltage, available on lead 228, is amplified in a voltage gain circuit 229 whose output thus provides a processed resulting total voltage on lead 230. The processed resulting total voltage, obtained in the described way, is then added in a positive feedback manner via lead 230 to the forward control signal, provided via lead 208, and to the feedforward signal, provided by lead 231, in a summing circuit 209 providing the resulting total control signal $\Delta V_c(s)$ at point 210. The processed back emf signal, available on lead 214, is obtained by passing a tach signal, available on lead 298, through a tach gain circuit 297, whose gain is chosen such that the overall gain of a tach and tach gain circuit is equal to $K_m/A$. The tach signal is provided on lead 298 by using a tach 299, characterized by a gain constant $K_v$, to sense the angular shaft speed $\Delta \Omega_o(s)$. For the tach 299 characterized by the gain constant $K_v$, the gain of the tach gain circuit 297 is $K_m/AK_v$ to provide for the overall gain of blocks 299 and 297 to be $K_m/A$. The resulting total control signal $\Delta V_c(s)$, available at point 210, is applied to a pulse width modulation control and power stage 211 where it is voltage amplified A times appearing as voltage $\Delta V(s)$ on lead 207 which, opposed by the back emf $\Delta V_b(s)$ inherently produced within a motor on lead 266, creates motor current $\Delta I(s)$ through the motor equivalent impedance $Z_{ekv}(s)$. As discussed earlier with reference to FIG. 1, both the resulting total control signal $\Delta V_c(s)$, available at point 210, and the processed back emf signal, available on lead 214, are A times smaller than the corresponding voltages $\Delta V(s)$ and $\Delta V_b(s)$, respectively, so that the resulting total voltage, available on lead 228, is actually a resulting total voltage, but A times smaller, effectively acting across the motor impedance $Z_{ekv}(s)$. By subtracting the processed back emf signal on lead 214 from the resulting total control signal $\Delta V_c(s)$, available at point 210, the necessary signal processing is done outside from the switched (PWM) domain and the processed resulting total voltage fed back in the positive feedback manner via lead 230 effectively provides for the voltage drop across the motor impedance $Z_{ekv}(s)$. The resulting total voltage, produced on lead 228, has to be amplified by the amount of feedback of the negative voltage feedback loop, equal to $(1+AK_eK_f)$, provided by the voltage gain circuit 229, in order to effectively cancel the reduced-gain effect due to the negative feedback loop and to appear as the processed resulting total voltage on lead 230 to close the positive voltage feedback loop and to effectively provide for the voltage drop across the motor impedance $Z_{ekv}(s)$ after being voltage amplified A times in the PWM control and power block 211. Thus, the effects due to the impedance $Z_{ekv}(s)$ are nulled out in both transient and steady state as the transient voltage drop across the impedance (due to the nonzero impedance $Z_{ekv}(s)$) as well as the steady state voltage drop across the impedance (due to the nonzero impedance $Z_{ekv}(s)$) are compensated for by the action of the voltage positive feedback loop. Therefore, the action of the positive feedback loop essentially forces the (effects due to) motor impedance $Z_{ekv}(s)$ to zero by compensating for the voltage drop across $Z_{ekv}(s)$ in both steady state and transient and without knowledge about the values of the parameters (inductive and resistive) of the motor impedance $Z_{ekv}(s)$, as well as without sensing/measuring current $\Delta I(s)$ through the impedance $Z_{ekv}(s)$.

As mentioned before, the implementation of the PWM control and power stage 211 is irrelevant for the functioning of the embodiment of FIG. 2. It is only the voltage gain A of block 211 which is involved in the algorithms of the embodiment. Although other combinations are also possible, the signal portion of the embodiment of FIG. 2, which excludes only the power part of the PWM stage 211 and, of course, the motor itself (239), is understood to be operating on a dc varying signals which means that a lowpass filtering is assumed (not shown in FIG. 2) prior to feeding the voltage feedback circuit 206 in order to process only a dc (average) component of the PWM voltage applied to a dc motor ($\Delta V(s)$), or only a fundamental sinusoidal component or a pulsed waveform filtered from the actual PWM waveform $\Delta V(s)$, in cases of ac and step motors, respectively, and rms-converted (not shown in FIG. 2), are signal-processed. The type of the signal processing does not affect the algorithms derived.

The scaling factor m in blocks 234 and 232 is dimensioned in [radian/Volt] for the position voltage command $\Delta V_i(s)$ applied to terminal 238, i.e., for the correspondence $\Delta V_i \rightarrow \theta_i(s)$. In case of a velocity command voltage, corresponding to the input velocity command $\Delta \omega_i(s)$, applied to point 233, the scaling factor has units in [radian/sec/Volt]. Due to the differentiator operator s in block 237, the effective dimensioning associated with blocks 234 and 232 is identical with regards to the dimension for m and is equal to [rad/sec/V]. The back emf constant $K_m$ in blocks 225, 297, 234, and 232, is dimensioned in [V/rad/sec]. Since the voltage gain blocks 206 and 211, characterized with constants $K_e$ and A, respectively, are dimensionless, it follows that blocks 234 and 232, characterized by a transfer functions that will shortly be derived and shown in FIG. 2 as $K_i = mK_mK_e$ and $K_i' = mK_m/A$, are also dimensionless, representing voltage gain circuits. The tach gain constant $K_v$, dimensioned in [V/rad/sec], and the dimensionless gain constant $K_f$ of the forward circuit yield dimensionless gain constants of the tach gain circuit 297 and the voltage gain circuit 229. The combined gain of tach 299 and tach gain circuit 297, equal to $K_m/A$, is thus dimensioned in [V/rad/sec].

A mathematical analysis of the embodiment of FIG. 2 follows. (Assume $K_i'\Delta\omega_i(s)=0$).

From FIG. 2,
$\Delta V_c(s) = K_f\Delta V_{\epsilon1}(s) - AK_eK_f\Delta V_c(s) + (1+AK_eK_f)[\Delta V_c(s) - K_m\Delta\omega_o(s)/A] = K_f\Delta V_{\epsilon1}(s) + \Delta V_c(s) - K_m(-1+AK_eK_f)\Delta\omega_o(s)/A$ so that $\Delta V(s) = A\Delta V_c(s)$ can also be written as $$\Delta V(s) = A[K_f\Delta V_{\omega1}(s) + \Delta V_c(s) - K_m(1+AK_eK_f)\Delta\omega_o(s)/A]$$
$$= AK_f\Delta V_{\epsilon1}(s) + A\Delta V_c(s) - K_m(1+AK_eK_f)\Delta\omega_o(s).$$

Also, from FIG. 2, $\Delta V(s) - \Delta V_b(s) = Z_{ekv}(s)\Delta I(s)$. Combining the last two expressions $$AK_f\Delta V_{\omega1}(s) + A\Delta V_c(s) - K_m(1+AK_eK_f)\Delta\omega_o(s) - \Delta V_b(s) = Z_{ekv}(s)\Delta I(s).$$

But, $A\Delta V_c(s) = \Delta V(s)$ and, also, for $\Delta T_l(s) = 0$, $\Delta\omega_o(s) = (1/sJ)G_M(s)\Delta I(s)$ so that $$AK_f\Delta V_{\epsilon1}(s) = -[\Delta V(s) - \Delta V_b(s) + \Delta I(s)]$$
$$[K_m(K_m(1+AK_eK_f)(1/sJ)G_M(s) + Z_{ekv}(s)]$$
$$= \Delta I(s)$$
$$[-Z_{ekv}(s) + K_m(1+AK_eK_f)(1/sJ)G_M(s) + Z_{ekv}(s)].$$

Therefore, the transadmittance of the embodiment of FIG. 2 is $$\Delta I(s)/\Delta V_{\epsilon1}(s) = AK_f/[K_m(1+AK_eK_f)(1/sJ)G_M(s)] \quad (24)$$

A transfer function from the input to the current-free and parameter-free zero-impedance converter (point 201) to the angular shaft speed (point 222) is therefore (obtained as $\Delta\omega_o(s)/\Delta V_{\epsilon1}(s) = [\Delta I(s)/\Delta V_{\epsilon1}(s)][\Delta\omega_o(s)/\Delta I(s)]$)

$$\Delta\omega_o(s)/\Delta V_{\epsilon1}(s) = AK_f/[K_m(1+AK_eK_f)] \quad (25)$$

In a general case, the forward circuit 205 can be characteerized by a complex transfer function $G_R'(s)$. Replacing constant $K_f$ with transfer function $G_R'(s)$ the transfer function of the embodiment in FIG. 2 is $$\Delta\theta_o(s)/\Delta\theta_i(s) = [G_R'(s)K_i']/[G_R'(s)K_mK_e + (K_m/A)] \quad (26)$$

The dynamic stiffness of the embodiment of FIG. 2 is $$-\Delta T_l(s)/\Delta\theta_o(s) = [T_1(s) + T_2(s)][[1+AK_eK_f][Z_{ekv}(s) - Z_{ekv}(s)]] + T_4(s)]/[[1+AK_eK_f][Z_{ekv}(s) - Z_{ekv}(s)]] = \infty \quad (27)$$

where $$T_1(s) = G_M(s)K_fAsK_mK_e \quad (28)$$

$$T_2(s) = s^2J \quad (29)$$

$$T_4(s) = G_M(s)sK_m \quad (30)$$

Denoting a part of the output angular shaft position response due to the input position command in Eq. (26) $\Delta\theta_{oi}(s)$, and a part of the output angular shaft position response due to the load torque disturbance in Eq. (27) $\Delta\theta_{ol}(s)$, the disturbance rejection ratio of the embodiment of FIG. 2 is $$D_{rr}(s) = \Delta\theta_{oi}(s)/\Delta\theta_{ol}(s) = \{T_1'(s) + T_4'(s)\}\Delta\theta_i(s)\} /\{[1+AK_eK_f][Z_{ekv}(s) - Z_{ekv}(s)]\cdot[-\Delta T_l(s)]\} = \infty \quad (31)$$

where $$T_1'(s) = G_M(s)K_fAsK_i \quad (32)$$

$$T_4'(s) = G_M(s)AsK_i' \quad (33)$$

Eqs. (27) and (31) imply a load independence of the embodiment of FIG. 2, i.e., infinite disturbance rejection ratio.

Eq. (25) implies that all electrical and mechanical time constants in the system in FIG. 2 are reduced to zero while keeping finite gain(s)! The embodiment of FIG. 2, in addition, effectively operates in an open loop mode with regards to the variables under the control, the angular shaft speed $\Delta\omega_o(s)$ and position $\Delta\theta_o(s)$, as both negative and positive voltage feedback loops may be considered locally closed. In spite of that, the embodiment of FIG. 2 achieves an ideal performance seen in the infinite disturbance rejection ratio (already shown) and in a zero order dynamics/instantaneous response (to be shown shortly).

In deriving Eq. (24) it can be seen that an infinite transadmittance part, equal to $AK_f/[Z_{ekv}(s) - Z_{ekv}(s)] = \infty$, is in series with the finite transadmittance part, given by Eq. (24), so that the total transadmittance is equal to the finite transadmittance part, i.e., $Y(s) = \Delta I(s)/\Delta V_{\epsilon1}(s) = AK_f/[Z_{ekv}(s) - Z_{ekv}(s) + K_m(-1+AK_eK_f)(1/sJ)G_M(s)]$, so that $1/Y(s) = 1/\{AK_f/[Z_{ekv}(s) - Z_{ekv}(s)]\} + 1/\{AK_f/[K_m(-1+AK_eK_f)(1/sJ)G_M(s)]\} = 1/Y_a(s) + 1/Y_b(s)$, where $Y_a(s) = \infty$, and $Y_b(s) = AK_f/[K_m(-1+AK_eK_f)(1/sJ)G_M(s)] = Y(s)$.

It is thus seen that all properties of the embodiment of FIG. 2, as given in Eqs. (24), (25), (26), (27), and (31) are due to forcing the motor equivalent impedance $Z_{ekv}(s)$ to zero. It is additionally seen that an independence from the mechanical parameters, including system moment of inertia J, as well as from the torque producing mechanisms $G_M(s)$ is achieved. It is now in order to show that the system transfer function, given in Eq. (26), can be reduced to a constant m implying a zero order dynamics of the embodiment of FIG. 2.

It is seen from Eq. (26) that the transfer function of the embodiment can be brought to a constant m, implying a zero order dynamics, for direct path circuit 234 and feedforward circuit 232 synthesized to provide constant gains $$K_i = mK_mK_e \quad (34)$$

$$K_i' = mK_m/A \quad (35)$$

For conditions in Eqs. (34) and (35), Eq. (26) becomes $$\Delta\theta_o(s)\Delta\theta_i(s) = m \qquad (36)$$

The zero order dynamics provided in Eq. (36) implies instantaneous response to the input command with associated zero error in both steady state and transient.

The property of the embodiment of FIG. 2 of forcing the impedance $Z_{ekv}(s)$ to zero therefore provided for the infinite disturbance rejection ratio, resulting in Eq. (31), and this same property together with the conditions in Eqs. (34) and (35) provided for the zero order dynamics, resulting in Eq. (36).

It has been shown that the characteristics of the embodiment of FIG. 2, culminating in Eqs. (31) and (36), have been obtained in an effectively open loop mode of operation (with respect to the variables under the control $\Delta\omega_o(s)$ and $\Delta\theta_o(s)$) and without: (a) sensing (PWM) waveform of current through the motor impedance $Z_{ekv}(s)$, (b) processing signals in the switched (PWM) domain which inherently is noisy and has ripple, (c) using differentiation, (d) knowing resistive and reactive parameters of the motor impedance $Z_{ekv}(s)$, (e) knowing mechanisms of torque production $G_M(s)$, and (f) without respect to the system mechanical parameters, including moment of inertia J and nonlinearities.

Figure 3:
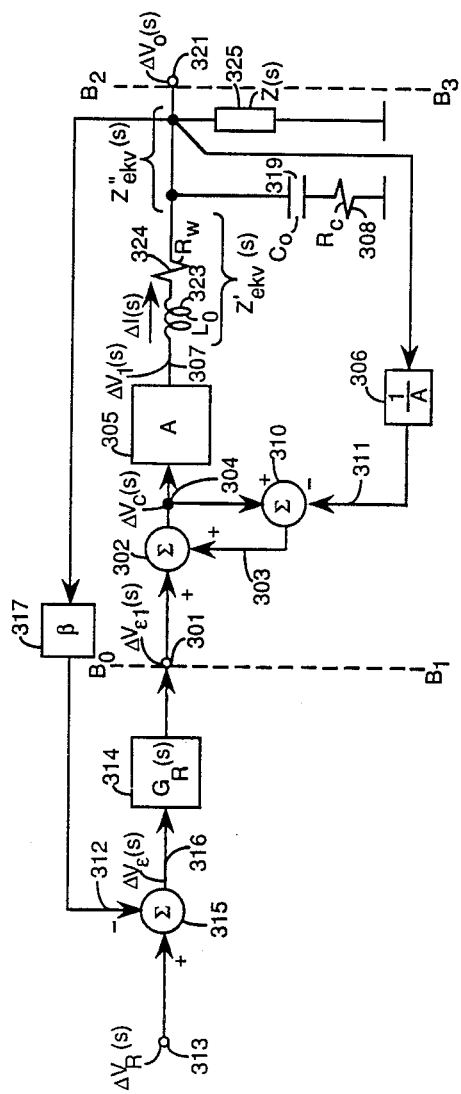
FIG. 3 is a block and schematic diagram of yet another embodiment of the invention.

A current-free and parameter-free zero-impedance converter embodying the principles of the invention applied to synthesizing a load independent power converter is shown in FIG. 3. In FIG. 3, it is assumed that input voltage $V_{in}$ (not illustrated) applied to power stage within block 305 is constant, or that its variation is compensated by a feedforward technique which is well known in the art and will not be elaborated here except to say that it is based on adjusting a slope of a rising edge of a sawtooth waveform, inherent in a pulse width modulation (PWM) stage 305, in proportion to the input voltage $V_{in}$. Then a gain constant A characterizes transfer function of the PWM control and power stage 305. Thus, a signal $\Delta V_c(s)$ on lead 304 is voltage-amplified A times to appear as voltage $\Delta V_1(s)$ on lead 307 with an associated power//current $\Delta I(s)$ supplied by the input voltage source $V_{in}$. Although a dc-to-dc power converter has been assumed within block 305, the principles of the embodiment equally apply to other converter types.

In FIG. 3, portion between boundaries $B_0$–$B_1$ and $B_2$–$B_3$ denotes current-free and parameter-free zero-impedance converter; the remaining portion illustrates a remaining implementation of the embodiment in applying it in synthesizing a load invariant power converter.

The current-free and parameter-free zero-impedance converter employs a positive voltage feedback loop. A negative voltage feedback loop is also closed around the current-free and parameter-free zero-impedance converter. The positive voltage feedback loop incorporates a voltage algebraic summer 310 which provides at its output, lead 303, a resulting total voltage as a result of subtracting a processed output voltage signal, available on lead 311, from a resulting total control signal $\Delta V_c(s)$, available at point 304. The negative voltage feedback loop may incorporate a voltage sampling network 317 which is a resistive network whose transfer function is $\beta$. The purpose of the positive voltage feedback loop is to synthesize in a current-free and parameter-free manner the zero-impedance converter with respect to an output lowpass filter inductor impedance $Z_{ekv}'(s)$ which is forced to zero by an equal but negative impedance value provided by the action of the loop. The purpose of the negative voltage feedback loop is to stabilize the system and control its dynamics by means of a stabilizing network 314 whose transfer function is $G_R(s)$.

In operation, the current $\Delta I(s)$ flows through the output filter inductor whose impedance is $Z_{ekv}'(s)$. The output filter consists of inductor of inductance 323 whose value is L and resistance 324 whose value is $R_w$, and capacitor of capacitance 319 whose value is $C_o$ and equivalent series resistance 308 whose value is $R_c$. A complex load impedance 325 of value $Z(s)$ is connected in parallel with the output filter capacitor and this parallel connection is of value $Z_{ekv}''(s)$. The output filter inductor current $\Delta I(s)$ supplies impedance $Z_{ekv}''(s)$, providing for an output dc voltage $\Delta V_o(s)$ at terminal 321. A sample of the output voltage is fed back in a negative voltage feedback loop via lead 312 and compared in an algebraic summing circuit 315 with a reference voltage $\Delta V_R(s)$ applied to terminal 313, to produce an error signal $\Delta V_\epsilon(s)$ on lead 316. The eror signal $\Delta V_\epsilon(s)$ is processed in a stabilizing network 314 to produce a processed error signal $\Delta V_{\epsilon 1}(s)$ at point 301.

A resulting total voltage is obtained by subtracting a processed output voltage signal, available on lead 311, from a resulting total control signal $\Delta V_c(s)$, available at point 304, in a voltage algebraic summer 310. The resulting total voltage, available on lead 303, is added in a positive feedback manner, via lead 303, to the processed error signal $\Delta V_{\epsilon 1}(s)$, provided by lead 301, in a summing circuit 302 providing the resulting total control signal $\Delta V_c(s)$ at point 304. The processed output voltage signal, available on lead 311, is obtained by passing the output dc voltage $\Delta V_o(s)$, available at terminal 321, through a voltage gain circuit 306 whose gain is equal to 1/A. The resulting total control signal $\Delta V_c(s)$, available at point 304, is applied to a pulse width modulation control and power stage 305 where it is voltage amplified A times appearing as voltage $\Delta V_1(s)$ on lead 307. The voltage $\Delta V_1(s)$ is controlled but unfiltered. The lowpass filtering of voltage $\Delta V_1(s)$ is done in the output filter described above yielding the output dc voltage $\Delta V_o(s)$ at terminal 321.

Again, as in connection with embodiments in FIGS. 1 and 2, both the resulting total control signal $\Delta V_c(s)$, available at point 304, and the processed output voltage signal, available on lead 311, being A times smaller than a corresponding voltages $\Delta V_1(s)$ and $\Delta V_o(s)$, respectively, produce on lead 303 a voltage difference $[[\Delta V_1(s) - \Delta V_o(s)]/A]$. This voltage difference is therefore fed back in the positive feedback manner and is voltage-amplified A times in the PWM control and power stage 305 to effectively compensate for the voltage drop across the output lowpass filter inductor impedance $Z_{ekv}'(s)$ equal to $[\Delta V_1(s) - \Delta V_o(s)]$. Thus, the effects due to the nonzero impedance $Z_{ekv}'(s)$ are nulled out in both steady state and transient as both the steady state and transient voltage drop across the impedance $Z_{ekv}'(s)$ are compensated for by the action of the positive feedback loop. Therefore, the action of the positive voltage feedback loop effectively forces the (effects due to) output lowpass filter inductor impedance $Z_{ekv}'(s)$ to zero by compensating for the voltage drop across $Z_{ekv}'(s)$ in both steady state and transient and without having to know the parameters of the impedance $Z_{ekv}'(s)$, i.e., its resistive and reactive values, as well as without sensing/measuring current $\Delta I(s)$ through the impedance $Z_{ekv}'(s)$.

A mathematical analysis of the embodiment of FIG. 3 follows. In FIG. 3, $Z_{ekv}'(s) = R_w + sL_o$ and $Z_{ekv}''(s) = [R_c + (1/sC_o)] \parallel Z(s)$. From FIG. 3, $\Delta V_c(s) = \Delta V_{\epsilon 1}(s) + \Delta V_c(s) - \Delta V_o(s)/A = \Delta V_{\epsilon 1}(s) + \Delta V_c(s) - \Delta I(s) Z_{ekv}''(s)/A$ so that $\Delta V_1(s) = A \Delta V_c(s)$ can also be written as $\Delta V_1(s) = A[\Delta V_{\epsilon 1}(s) + \Delta V_c(s) - \Delta I(s) Z_{ekv}''(s)/A] = A \Delta V_{\epsilon 1}(s) + A \Delta V_c(s) - \Delta I(s) Z_{ekv}''(s)$.

Also, from FIG. 3, $\Delta V_1(s) - \Delta V_o(s) = Z_{ekv}'(s) \Delta I(s)$. Combining the last two expressions $A \Delta V_{\epsilon 1}(s) + A \Delta V_c(s) - \Delta I(s) Z_{ekv}''(s) - \Delta V_o(s) = Z_{ekv}'(s) \Delta I(s)$. But, $A \Delta V_c(s) = \Delta V_1(s)$ so that $A \Delta V_{\epsilon 1}(s) = -[\Delta V_1(s) - \Delta V_o(s)] + \Delta I(s)[Z_{ekv}''(s) + Z_{ekv}'(s)] = \Delta I(s)[-Z_{ekv}'(s) + Z_{ekv}''(s) + Z_{ekv}'(s)]$.

Therefore, the transadmittance of the embodiment of FIG. 3 is $$\Delta I(s)/\Delta V_{\epsilon 1}(s) = A/Z_{ekv}''(s) \quad (37)$$

The transfer function of the current-free and parameter-free zero-impedance converter of FIG. 3 is $$\Delta V_o(s)/\Delta V_{\epsilon 1}(s) = A/\{[1 + sC_o(sL_o + R_w)/(1 + sC_o R_c)] - [sC_o Z_{ekv}'(s)/(1 + sC_o R_c)] + [[Z_{ekv}'(s) - Z_{ekv}'(s)]/Z(s)]\} = A \quad (38)$$

Eq. (38) implies a load independence of the embodiment of FIG. 3 as well as independence to the variations of the parameters of the output filter capacitor $C_o$ and $R_c$. It also implies that electrical time constants due to the output filter reactive components are reduced to zero while keeping finite loop gain! The loop gain in the negative voltage feedback loop is $$LG(s) = A\beta G_R(s) \quad (39)$$

Eq. (39) implies a perfectly stable system wherein transfer function $G_R(s)$ is simply designed for any desired gain/phase margin. However, since the power converters are in general a regulator-type control systems, i.e., systems whose reference input does not change, it follows that by eliminating the load dependency, as it has been done here, and by eliminating dependence on input (line) voltage variations by using any of the known and established methods, e.g., the feedforward compensation assumed here, the design of the negative voltage feedback loop can be greatly simplified which reduces to a great simplification in designing block 314 which has been characterized by a complex transfer function $G_R(s)$ only for generality reasons.

In deriving Eq. (37) it can be seen that an infinite transadmittance part, equal to $A/[Z_{ekv}'(s) - Z_{ekv}'(s)] = \infty$, is in series with the finite transadmittance part, given by Eq. (37), so that the total transadmittance is equal to the finite transadmittance part, i.e. $Y(s) = \Delta I(s)/\Delta V_{\epsilon 1}(s) = A/[Z_{ekv}'(s) - Z_{ekv}'(s) + Z_{ekv}''(s)]$, so that $1/Y(s) = 1/Y_a(s) + 1/Y_b(s)$, where $Y_a(s) = A/[Z_{ekv}'(z) - Z_{ekv}'(s)] = \infty$ and $Y_b(s) = A/Z_{ekv}''(s) = Y(s)$.

It is thus seen that properties of the embodiment of FIG. 3, as given in Eqs. (37), (38), and (39) are due to forcing the output lowpass filter inductor impedance $Z_{ekv}'(s)$ to zero. In addition to the fundamental load independence property of the embodiment of FIG. 3, the further independence to the parameters of the output filter capacitor (indeed, the embodiment in FIG. 3 is invariant to the parameters of the output filter itself, including both the inductor and the capacitor), seen from Eq. (38), can be analyzed more closely as discussed next. (Of course, Eq. (38) could have been derived as $$\Delta V_o(s)/\Delta V_{\epsilon 1}(s) = \frac{\Delta I(s)}{\Delta V_{\epsilon 1}(s)} \cdot \frac{\Delta V_o(s)}{\Delta I(s)} = A).$$

Combining Eqs. (37) and (38)

$$\Delta I(s) = \Delta V_o(s)/Z_{ekv}''(s) \quad (40)$$

which, of course, could have been directly obtained from the inspection of FIG. 3. The meaning, however, of combining Eqs. (37) and (38) to yield Eq. (40) is in that the output voltage $\Delta V_o(s)$ is constant for any change of the impedance $Z_{ekv}''(s)$ because the current $\Delta I(s)$, involved as a third variable in Eq. (40), is able to change appropriately to keep the product $\Delta I(s) Z_{ekv}''(s)$ constant in both transient and steady state. Being a parallel connection of a complex load impedance $Z(s)$ and an output filter capacitor impedance $[R_c + (1/sC_o)]$, the impedance $Z_{ekv}''(s)$ changes when either load impedance or capacitor impedance changes. For any of those changes, the current through the inductor impedance $Z_{ekv}'(s)$ changes appropriately which is possible because it is supplied by an ideal voltage source whose impedance is actually the inductor impedance $Z_{ekv}'(s)$ which has been effectively reduced to zero so that the impedance $Z_{ekv}''(s)$ is fed by the ideal voltage source (the source impedance, $Z_{ekv}'(s)$, being forced to zero). The effects described are rather a circuit effects. As explained before, physically, the voltage drop across the output filter inductor is being cancelled in both transient and steady state when impedance $Z_{ekv}''(s)$ changes which provides for the constant output voltage at terminal 321.

It has been shown that the characteristics of the embodiment of FIG. 3, culminating in Eq. (38), have been obtained without: (a) sensing (PWM) waveform of current through the output lowpass filter inductor impedance $Z_{ekv}'(s)$, (b) processing signals from the switched (PWM) domain with associated noise and ripple problems, (c) using differentiation, (d) knowing resistive and inductive parameters of the inductor impedance $Z_{ekv}'(s)$, (e) knowing transfer function of a, in general case used, stabilizing network $G_R(s)$, and (f) without respect to the parameters of the input filter capacitor.

Various changes and modifications may be made, and fetures described in connection with any one of the embodiments may be used with any of the others within the scope of the inventive concept.

For example, the applications of a current-freee and parameter-free zero-impedance converter to a capacitive impedance may be performed without departing from the scope of the inventive concept.

Also, the applications in cases of inductive impedances are not limited to those described in this application (electric motors and switch-mode power converters). They are possible whenever the properties of the current-free and parameter-free zero-impedance converter, described here, are needed.

As with regards to FIGS. 1 and 2, the scaling constant m, conceptually employed in the signal portions of the respective embodiments, may easily be moved to a power portion of an embodiment, in order to facilitate higher voltage levels (when multiplying with m), without affecting any of the properties of the embodiments. The scaling constant m can be moved to increase voltage gain of the PWM power stage for, of course, keeping loop gains involving the PWM stage unchanged.

For example, in FIG. 1, this is done by: changing gain of the position direct path circuit 133 from $K_i=mK_{enc}K_g$ to $K_i=K_{enc}K_g$; changing gain of the velocity direct path circuit 129 from $K_i'=mK_v$ to $K_i'=K_v$; changing gain of the feedforward circuit 142 from $K_i''=mK_m/A$ to $K_i''=K_m/A$; changing gain of the PWM control and power stage from A to mA; changing gain of the tach from $K_v$ to $K_v/m$; and changing gain of the encoder from $K_{enc}$ to $K_{enc}/m$. In case of the embodiment of FIG. 2, moving scaling constant m may similarly be done: changing gain of the direct path circuit 234 from $K_i=mK_mK_e$ to $K_i=K_mK_e$; changing gain of the feedforward circuit 232 from $K_i'=mK_m/A$ to $K_i'=K_m/A$; changing gain of the PWM control and power stage from A to mA; changing gain of the voltage feedback circuit 206 from K to $K_e/m$; and changing gain of either the tach from $K_v$ to $K_v/m$ or the tach gain circuit 297 from $K_m/AK_v$ to $K_m/mAK_v$.

We claim:

1. A method for current-free synthesizing parameter-free zero-impedance converting comprising:

accepting a source of electrical energy of a constant voltage at an input, coupling mechanically a shaft of an electric motor to a load to be driven at an output, controlling a power flow from said input to said output, modulating a power converter for the control of said power flow in a pulse width modulation manner, supplying a resulting total control signal for modulating said power converter, supplying a position command obtained as a voltage command, passing said position command through a position direct path circuit;

thereby producing position command pulses, supplying position feedback pulses, feeding back said position feedback pulses in a negative feedback loop with respect to said position command pulses and comparing frequency and phase of two pulse trains in a phase frequency detector; thereby producing a position error voltage proportional to a difference in frequency and phase between two pulse trains, passing said position command through a velocity direct path circuit;

thereby producing a velocity command voltage, passing said position command through a feedforward circuit;

thereby producing a feedforward signal, supplying a velocity feedback signal, feeding back said velocity feedback signal in a negative feedback loop with respect to said velocity command voltage and said position error voltage and summing said velocity feedback signal and said velocity command voltage and said position error voltage; thereby producing a resulting error voltage, passing said resulting error voltage through a stabilizing and control circuit; thereby producing a control signal proportional to the algebraic sum of said velocity command voltage and said velocity feedback signal and said position error voltage, sampling said resulting total control signal, sensing an angular shaft speed of said electric motor by a tach and passing a tach signal through a tach gain circuit; thereby producing a processed back electromotive force signal, subtracting said processed back electromotive force signal from the sampled resulting total control signal in a voltage loop algebraic summer;

thereby producing a resulting total voltage, feeding back said resulting total voltage in a positive feedback loop with respect to said control signal and said feedforward signal and summing said resulting total voltage and said control signal and said feedforward signal, supplying said resulting total control signal, obtained as the sum of said control signal and said feedforward signal and said resulting total voltage, for modulating said power converter for the control of the flow of power from the input electrical source to the output mechanical load, whereby impedance of said electric motor is being forced to zero making an angular shaft position and speed independent of said load in a current free manner with respect to a current through said electric motor and a parameter free manner with respect to impedance parameters and making a transfer function from said position command to said angular shaft position a constant and therefore of zero order in said current free manner and said parameter free manner.

2. The method of claim 1 wherein said tach gain circuit is synthesized using a value providing gain of said tach gain circuit $$K_m/AK_v$$

in said value $K_m$ being a back electromotive force constant characterizing production of a back electromotive force proportional to said angular shaft speed of said electric motor, A being a voltage gain of a pulse width modulation control and power stage, and $K_v$ being a gain constant of said tach.

3. The method of claim 2 wherein said value providing gain of said tach gain circuit is physically implemented, thereby implementing said tach gain circuit as a circuit of constant gain $$K_m/AK_v$$

in said constant gain $K_m$ being a back electromotive force constant characterizing production of a back electromotive force proportional to the shaft speed, A being a voltage gain of a pulse width modulation control and power stage, and $K_v$ being a gain constant of said tach.

4. The method of claim 1 wherein said position direct path circuit is synthesized using an equation providing transfer function of said position direct path circuit $$K_i = mK_{enc}K_g$$

in said equation m being a scaling constant equal to said transfer function from said position command to said angular shaft position, $K_{enc}$ being a gain constant of a digital encoder, and $K_g$ being a gear ratio constant of a gear box.

5. The method of claim 4 wherein said equation providing transfer function of said position direct path circuit is physically implemented, thereby implementing said position direct path circuit, as a voltage to pulses converter of constant gain $$K_i = mK_{enc}K_g$$

in said constant gain m being a scaling constant equal to said transfer function from said position command to the shaft position, $K_{enc}$ being a gain constant of a digital encoder, and $K_g$ being the gear ratio.

6. The method of claim 1 wherein said velocity direct path circuit is synthesized using an equation providing differentiating time constant of said velocity direct path circuit $$K_i' = mK_v$$

in said equation m being a scaling constant equal to said transfer function from said position command to said angular shaft position, and $K_v$ being a gain constant of a tach.

7. The method of claim 6 wherein said equation providing differentiating time constant of said velocity direct path circuit is physically implemented, thereby implementing said velocity direct path circuit, as a differentiator circuit of differentiating time constant $$K_i' = mK_v$$

in said differentiating time constant m being a scaling constant equal to said transfer function from said position command to the shaft position, and $K_v$ being the tach constant.

8. The method of claim 1 wherein said feedforward circuit is synthesized using an equation providing differentiating time constant of said feedforward circuit $$K_i'' = mK_m/A$$

in said equation m being a scaling constant equal to said transfer function from said position command to said angular shaft position, $K_m$ being a back electromotive force constant characterizing production of a back electromotive force proportional to said angular shaft speed of said electric motor, and A being a voltage gain of a pulse width modulation control and power stage.

9. The method of claim 8 wherein said equation providing differentiating time constant of said feedforward circuit is physically implemented thereby implementing said feedforward circuit, as a differentiator circuit of differentiating time constant $$K_i'' = mK_m/A$$

in said differentiating time constant m being a scaling constant equal to said transfer function from said position command to the shaft position, $K_m$ being a back electromotive force constant characterizing production of a back electromotive force proportional to said angular shaft speed of said electric motor, and A being a voltage gain of a pulse width modulation control and power stage.

10. A method for current-freee synthesizing parameter-free zero-impedance converting comprising:
accepting a source of electrical energy of a constant voltage at an input,
coupling mechanically a shaft of an electric motor to a load to be driven at an output,
controlling a power flow from said input to said output,
modulating a power converter for the control of said power flow in a pulse width modulation manner,
supplying a resulting total control signal for modulating said power converter,
supplying a voltage feedback signal from a voltage applied to said electric motor,
feeding back said voltage feedback signal through a voltage feedback circuit in a negative feedback loop with respect to a direct path signal,
supplying an input velocity command obtained as a differentiated input position command,
passing said input velocity command through a direct path circuit; thereby producing said direct path signal,
passing said input velocity command through a feedforward circuit; thereby producing a feedforward signal,
passing a voltage error signal, obtained as an algebraic sum of said direct path signal and said voltage feedback signal fed through said voltage feedback circuit, through a forward circuit; thereby producing a forward control signal proportional to said algebraic sum of said direct path signal and said voltage feedback signal,
sampling said resulting total control signal,
sensing an angular shaft speed of said electric motor by a tach and passing a tach signal through a tach gain circuit; thereby producing a processed back electromotive force signal,
subtracting said processed back electromotive force signal from the sampled resulting total control signal in a voltage loop algebraic summer;
thereby producing a reesulting total voltage,
passing said resulting total voltage through a voltage gain circuit;
thereby producing a processed resulting total voltage,
feeding back said processed resulting total voltage in a positive feedback loop with respect to said forward control signal and said feedforward signal and summing said processed resulting total voltage and said forward control signal and said feedforward signal,
supplying said resulting total control signal, obtained as the sum of said forward control signal and said feedforward signal and said processed resulting total voltage, for modulating said power converter for the control of the flow of power from the input electrical source to the output mechanical load, whereby impedance of said electric motor is being forced to zero making an angular shaft position and speed independent of said load in a current free manner with rspect to a current through said electric motor and a parameter free manner with respect to impedance parameters and making a transfer function from the input position command to said angular shaft position a constant and therefore of zero order in said current free manner and said parameter free manner.

11. The method of claim 10 wherein said tach gain circuit is synthesized using a value providing gain of said tach gain circuit $$K_m/AK_v$$

in said value $K_m$ being a back electromotive force constant characterizing production of a back electromotive force proportional to said angular shaft speed of said electric motor, A being a voltage gain of a pulse width modulation control and power stage, and $K_v$ being a gain constant of said tach.

12. The method of claim 11 wherein said value providing gain of said tach gain circuit is physically implemented, thereby implementing said tach gain circuit, as a circuit of constant gain $$K_m/AK_v$$

in said constant gain $K_m$ being a back electromotive force constant characterizing production of a back electromotive force proportional to the shaft speed, A being a voltage gain of a pulse width modulation control and power stage, and $K_v$ being a gain constant of said tach.

13. The method of claim 10 wherein said voltage gain circuit is synthesized using a value providing gain of said voltage gain circuit $$1+AK_eK_f$$

in said value A being a voltage gain of a pulse width modulation control and power stage, $K_e$ being a voltage gain of a voltage feedback circuit, and $K_f$ being a voltage gain of a forward circuit.

14. The method of claim 13 wherein said value providing gain of said voltage gain circuit is physically implemented, thereby implementing said voltage gain circuit as a circuit of constant gain $$1+AK_eK_f$$

in said constant gain A being a voltage gain of a pulse width modulation control and power stage, $K_e$ being a voltage gain of a voltage feedback circuit, and $K_f$ being a voltage gain of a forward circuit.

15. The method of claim 10 wherein said direct path circuit is synthesized using an equation providing a transfer function of said direct path circuit $$K_i = mK_mK_e$$

in said equation m being a scaling constant equal to said transfer function from the input position command to said angular shaft position, $K_m$ being a back electromotive force constant characterizing production of a back electromotive force proportional to said angular shaft speed of said electric motor, and $K_e$ being a voltage gain of a voltage feedback circuit.

16. The method of claim 15 wherein said equation providing transfer function of said direct path circuit is physically implemented, thereby implementing said direct path circuit, as a circuit of constant gain $$K_i = mK_mK_e$$

in said constant gain m being a scaling constant equal to said transfer function from the input position command to the shaft position, $K_m$ being a back electromotive force constant characterizing production of a back electromotive force proportional to the shaft speed, and $K_e$ being a voltage gain of a voltage feedback circuit.

17. The method of claim 10 wherein said feedforward circuit is synthesized using an equation providing transfer function of said feedforward circuit $$K_i' = mK_m/A$$

in said equation m being a scaling constant equal to said transfer function from the input position command to said angular shaft position, $K_m$ being a back electromotive force constant characterizing production of a back electromotive force proportional to said angular shaft speed of said electric motor, and A being a voltage gain of a pulse width modulation control and power stage.

18. The method of claim 17 wherein said equation providing transfer function of said feedforward circuit is physically implemented, thereby implementing said feedforward circuit, as a circuit of constant gain $$K_i' = mK_m/A$$

in said constant gain m being a scaling constant equal to said transfer function from the input position command to the shaft position, $K_m$ being a back electromotive force constant characterizing production of a back electromotive force proportional to the shaft speed, and A being a voltage gain of a pulse width modulation control and power stage.

19. A method for current-free synthesizing parameter-free zero-impedance converting comprising:
accepting a source of electrical energy of a constant voltage at an input,
coupling through an output filter to a load to be energized at an output,
controlling a power flow from said input to said output,
modulating a power converter for the control of said power flow in a pulse width modulation manner,
supplying a resulting total control signal for modulating said power converter,
sampling a voltage across said load,
feeding back a sampled voltage signal in a negative feedback loop with respect to a reference voltage and summing said sampled voltage signal and said reference voltage,
passing a signal obtained as an algebraic sum of said sampled voltage signal and said reference voltage through a stabilizing network;
thereby producing a processed error signal proportional to a difference between said reference voltage and said sampled voltage signal,
sampling said reesulting total control signal,
passing the sampled voltage across said load through a voltage gain circuit;
thereby producing a processed output voltage signal,
subtracting said processed output voltage signal from the sampled resulting total control signal in a voltage algebraic summer;
thereby producing a resulting total voltage,
feeding back said resulting total voltage in a positive feedback loop with respect to said processed error signal and summing said processed error signal and said resulting total voltage,
supplying said resulting total control signal, obtained as the sum of said processed error signal and said resulting total voltage, for modulating said power converter for the control of the flow of power from the input electrical source to the output load, whereby impedance of an inductor of said output filter is being forced to zero making said voltage across said load independent of said load and of variations of a capacitor of said output filter by making a transfer function from said processed error signal to said voltage across said load a constant in a current free manner with respect to a current through said inductor of said output filter and a parameter free manner with respect to inductor impedance parameters.

20. The method of claim 19 wherein said voltage gain circuit is physically impemented as a circuit of constant gain in said constant gain A being a voltage gain of a pulse width modulation control and power stage.

* * * * *

UNITED STATES PATENT AND TRADEMARK OFFICE
CERTIFICATE OF CORRECTION

PATENT NO. : 4,980,620

DATED : December 25, 1990

INVENTOR(S) : Novica A. Losic, et al

It is certified that error appears in the above-identified patent and that said Letters Patent is hereby corrected as shown below:

Abstract, line 3, change the last occurence of the word "feed" to —fed—.

Col.1, line 40, change "Switch-Power Converters" to —Switch-Mode Power Converters—.

Col.2, line 9, change "a parameter-free-impedance converter' to —a parameter-free zero-impedance converter—.

Col.2, line 21, change "rattio" to —ratio—.

Col.3, line 50, change "lead" to —load—.

Col.4, line 49, change "in" to —is—.

Col.4, line 52, change "is" to —it—.

Col.4, line 54, change "for a motors" to —for ac motors—.

Col.4, line 61, delete word "in".

Col.4, line 63, change "$\Delta(V)(s)$" to —$\Delta V(s)$—.

Col.5, line 6, change "backback" to —feedback—.

Col.5, line 20, change "provides" to —provided—.

Col.5, line 26, change "positive" to —position—.

UNITED STATES PATENT AND TRADEMARK OFFICE
CERTIFICATE OF CORRECTION

PATENT NO. : 4,980,620

DATED : December 25, 1990

INVENTOR(S) : Novica A. Losic, et al

It is certified that error appears in the above-identified patent and that said Letters Patent is hereby corrected as shown below:

Col.6, lines 10, 37, 45; Col.9, lines 6, 8, 9, 13, 24 (both occurencies), 27; Col.12, line 58; and Col.13, line 61, change "$\Delta\Omega_o(s)$" to —$\Delta\omega_o(s)$—.

Col.6, line 23, change "$K_m(a)$" to —$K_m(s)$—.

Col.6, lines 54, 62; Col.7, line 23; Col.9, line 4; and Col.13, lines 32, 37, change "$\Delta\Omega_i(s)$" to —$\Delta\omega_i(s)$—.

Col.7, line 7, change "measn" to —means—.

Col.7, line 16, change "TThe stabilizing and control 145" to —The stabilizing and control circuit 145—.

Col.7, line 52, change "$\Delta V(s)$" to —$\Delta V_c(s)$—.

Col.8, line 5, change "(due to the nonzero impedance $Z_{ekv}(s)$" to —(due to the nonzero impedance $Z_{ekv}(s)$)—.

Col.8, lines 35 and 36, cancel (the second occurence of) "its fundamental component corresponds to a sinusoidal voltage seen by an ac motor".

UNITED STATES PATENT AND TRADEMARK OFFICE
CERTIFICATE OF CORRECTION

PATENT NO. : 4,980,620

DATED : December 25, 1990

INVENTOR(S) : Novica A. Losic, et al

It is certified that error appears in the above-identified patent and that said Letters Patent is hereby corrected as shown below:

Col.8, line 42; and Col.14, line 65, change "$\Delta V_i(s) \rightarrow \Delta \Theta_i(s)$" to —$\Delta V_i(s) \leftrightarrow \Delta \Theta_i(s)$—.

Col.9, line 10, change "$XV(s)$" to —$\Delta V(s)$—.

Col.9, line 15, change "$+Z_{ekv}(s)=$" to —$+Z_{ekv}(s)]=$—.

Col.9, line 39, change "$=[T_\ell(s)+T_2(s)[Z_{ekv}(s)-Z_{ekv}(s)[$" to —$=[T_1(s)+T_2(s)[Z_{ekv}(s)-Z_{ekv}(s)]$—.

Col.10, line 2, change "$R_R'(s)$" to —$G_R'(s)$—.

Col.10, line 22, change "$]\}1/Y_a(s)+1Y_b(s)$" to —$]\}=1/Y_a(s)+1/Y_b(s)$—.

Col.12, line 52, change "$1sJ$" to —$1/sJ$—.

Col.15, line 26, change "$\Delta V_{\omega 1}(s)$" to —$\Delta V_{\epsilon 1}(s)$—.

Col.15, line 32, change "$AK_f \Delta V_{\omega 1}(s)$" to —$AK_f \Delta V_{\epsilon 1}(s)$—.

Col.15, line 38, change "$=-[\Delta V(s)-\Delta V_b(s)+\Delta I(s)$" to —$=-[\Delta V(s)-\Delta V_b(s)]+\Delta I(s)$—.

Col.15, line 39, change "$[K_m(K_m(1+AK_e K_f)$" to —$[K_m(1+AK_e K_f)$—.

Col.15, line 60, change "$=[G_R'(s)K_1']/$" to —$=[G_R'(s)K_1+K_1']/$—.

Col.16, line 13, change "$=\{T_1'(s)+T_4'(s)]\Delta \Theta_i(s)\}$" to —$=\{[T_1'(s)+T_4'(s)]\Delta \Theta_i(s)\}$—.

UNITED STATES PATENT AND TRADEMARK OFFICE
CERTIFICATE OF CORRECTION

PATENT NO. : 4,980,620

DATED : December 25, 1990

INVENTOR(S) : Novica A. Losic, et al

It is certified that error appears in the above-identified patent and that said Letters Patent is hereby corrected as shown below:

Col.16, line 14, change "$[-\Delta T_\ell(s)\}$" to —$[-\Delta T_\ell(s)]\}$—.

Col.18, line 6, change "L" to —$L_o$—.

Col.20, line 45, change "input" to —output—.

Col.21, line 16, change "K" to —$K_e$—.

Signed and Sealed this

Sixth Day of October, 1992

Attest:

DOUGLAS B. COMER

Attesting Officer     Acting Commissioner of Patents and Trademarks